United States Patent
Nielsen

(10) Patent No.: US 9,149,965 B2
(45) Date of Patent: Oct. 6, 2015

(54) METHOD FOR DETECTING INSERT OBJECTS IN AN INJECTION-MOULDED PART

(75) Inventor: Erik Nielsen, Herfolge (DK)

(73) Assignee: KISTLER HOLDING AG, Winterthur (CH)

( * ) Notice: Subject to any disclaimer, the term of this patent is extended or adjusted under 35 U.S.C. 154(b) by 313 days.

(21) Appl. No.: 13/697,495

(22) PCT Filed: May 18, 2011

(86) PCT No.: PCT/CH2011/000114
§ 371 (c)(1),
(2), (4) Date: Nov. 12, 2012

(87) PCT Pub. No.: WO2011/143786
PCT Pub. Date: Nov. 24, 2011

(65) Prior Publication Data
US 2013/0056893 A1 Mar. 7, 2013

(30) Foreign Application Priority Data
May 19, 2010 (CH) .......................... 786/10

(51) Int. Cl.
*B29C 45/14* (2006.01)
*B29C 45/84* (2006.01)
(Continued)

(52) U.S. Cl.
CPC ............... *B29C 45/842* (2013.01); *B29C 45/77* (2013.01); *B29C 45/14065* (2013.01);
(Continued)

(58) Field of Classification Search
CPC ............... B29C 2045/14172; B29C 45/14065; B29C 45/14; B29C 45/768

USPC ...................................................... 264/40.1
See application file for complete search history.

(56) References Cited

U.S. PATENT DOCUMENTS 5,582,845 A 12/1996 Schad et al.
2009/0174121 A1* 7/2009 Hayes et al. ................. 264/447

FOREIGN PATENT DOCUMENTS

DE 102005011249 9/2006
DE 202008014027 5/2009
(Continued)

OTHER PUBLICATIONS

Sone et al., JP 2009-260054 A, "Apparatus for sealing substrate positioned in cavity by resin, has determination unit that performs abnormality determination when real pressure of resin in cavity exceeds permissible range", Nov. 2009, Derwent Abstract.*
(Continued)

*Primary Examiner* — Galen Hauth
(74) *Attorney, Agent, or Firm* — Dority & Manning, P.A.

(57) ABSTRACT

A method for detecting an insert object in an injection-molded part pertains to an insert object that is fixedly connected to the injection-molded part during the injection molding by the insert object being placed in a cavity, which is surrounded by a mold wall of a mold, before the beginning of the injection-molding cycle. The mold wall includes at least one temperature or pressure sensor, which records and analyzes at least one measured value at at least one point in time during an injection-molding cycle. On the basis of the analysis, it is established whether an insert object was present at a specific location in the cavity during the injection-molding cycle. Finally, after it is ejected, the injection-molded part is sorted as an accepted part or a rejected part on the basis of the analysis of the measured value.

14 Claims, 1 Drawing Sheet

(51) Int. Cl.
  *B29C 45/77* (2006.01)
  *B29K 705/00* (2006.01)
  *B29K 711/08* (2006.01)

(52) U.S. Cl.
  CPC ............... *B29C 45/14647* (2013.01); *B29C 2045/14918* (2013.01); *B29C 2945/76167* (2013.01); *B29C 2945/76294* (2013.01); *B29C 2945/76501* (2013.01); *B29C 2945/76535* (2013.01); *B29C 2945/76638* (2013.01); *B29C 2945/76739* (2013.01); *B29C 2945/76859* (2013.01); *B29K 2705/00* (2013.01); *B29K 2711/08* (2013.01); *B29K 2713/00* (2013.01)

(56) References Cited

FOREIGN PATENT DOCUMENTS

| JP | 56011235 | 2/1981 |
| JP | 60068918 | 4/1985 |
| JP | 60219017 | 11/1985 |
| JP | 63220967 | 9/1988 |
| JP | 8124780 | 5/1996 |
| JP | 2009090594 | 4/2009 |
| JP | 200926054 | 11/2009 |

OTHER PUBLICATIONS

Sone et al., JP 2009-260054 A, "Apparatus for sealing substrate positioned in cavity by resin, has determination unit that performs abnormality determination when real pressure of resin in cavity exceeds permissible range", Nov. 2009, Machine Translation.*
International Search Report, issued Oct. 19, 2011.
International Preliminary Report on Patentability, issued 11/201/2012.
N.N.: "Abrage der Formnester mit einem Sensor", Forum Spritzguss Web—Andwendungstechnik, with English translation.

* cited by examiner

METHOD FOR DETECTING INSERT OBJECTS IN AN INJECTION-MOULDED PART

CROSS-REFERENCE TO RELATED APPLICATIONS

This application claims priority to International Application Serial No. PCT/CH2011/000114, filed May 18, 2011, which claims priority to Swiss Application No. CH 786/10 filed May 19, 2010. International Application Serial No. PCT/CH2011/000114 is hereby incorporated herein for all purposes by this reference.

FIELD OF THE INVENTION

The invention pertains to a method for detecting an insert object in an injection-moulded part, wherein the insert object is rigidly connected to the injection-moulded part during the injection moulding process due to the fact that the insert object was placed into a cavity that is surrounded by a mould wall of a mould before the beginning of the injection moulding cycle.

BACKGROUND

In injection moulding processes, insert objects are frequently placed into the cavity in order to provide the injection-moulded product with a certain surface, for example, by means of an externally arranged foil. Examples of such products are yogurt cups or insulin syringes. The surfaces of such insert objects feature, for example, product-specific information, advertising, an expiration date and/or a barcode.

During the manufacture of an injection-moulded part, an error may occur and no insert object or more than one insert object is inadvertently placed into the cavity. A thusly manufactured injection-moulded part needs to be sorted out as a reject part after the manufacture.

A quality control is nowadays carried out after the manufacturing process in order to detect such errors, i.e., in order to determine the presence of an insert object or exactly one insert object. This is realized with the aid of cameras that create images of the finished injection-moulded products. Elaborate analyses of these images ultimately make it possible to determine whether the injection-moulded part features a desired insert object such that the injection-moulded part can be accordingly sorted as an acceptable part or a reject part.

U.S. Pat. No. 5,582,845 discloses a system that optically detects inserts by means of a camera before the injection moulding process is carried out. If the insert is missing, an alarm is activated and the system backs up and obtains an insert in order to correct the error. In DE 202008014027U1, JP 60219017, JP 60068918 and JP 63220967, an insert part likewise is respectively detected prior to the injection moulding process and the process is stopped if it is determined that such an insert part is missing. In this way, the manufacture of defective parts is prevented.

All these methods indeed successfully prevent the manufacture of defective parts without inserts. However, it was determined that the process needs to be started up anew after a machine stop such that other complications may arise, particularly due to varied temperatures of the molten masses, to cite just one example.

In addition, optical methods proved to be problematic because different gray scales need to be reliably evaluated and a complicated evaluation system is required for this purpose.

BRIEF SUMMARY OF THE INVENTION

It is the objective of the present invention to disclose a method of the initially cited type for detecting an insert object in an injection-moulded part which is less elaborate and less costly than known methods. In addition, this method preferably should not disturb the injection moulding process.

This objective is attained with the characteristics described below.

According to the basic principle of the invention, it is initially proposed to arrange at least one temperature sensor or pressure sensor in the mould wall, wherein said sensor records at least one measured value in the form of a temperature or a pressure at least at one point in time during the injection moulding cycle. This measured value is ultimately analyzed. Based on this analysis, it is then determined whether or not an insert object was present at a certain location in the cavity during the injection moulding cycle. After the ejection of the injection-moulded part, it is sorted as an acceptable part or a reject part based on the analysis of the measured value.

The advantage of this method can be seen in that it is already certain whether or not the injection-moulded part is an acceptable part when it is ejected. Consequently, not only a camera and another elaborate analysis are eliminated, but also the required handling of the injection-moulded part after its ejection.

In addition, the manufacturing process is not interrupted for this detection, but the defective part rather is merely sorted out. In many instances, the damage caused by the production of rejects is much lower than an interruption of the process because it is not required to start up the process anew in this case.

Another advantage can be seen in that optical detection systems are replaced with temperature or pressure sensors, the measured values of which can be very easily evaluated. In the inventive method, it is also preferred to carry out the measurement during the injection moulding process. This provides the advantage that the thusly obtained measured values can also be used for the injection moulding process. This means that already existing sensors can be used or that the sensors used may simultaneously serve for controlling the system in certain instances.

Other advantageous methods are described below.

In this document, the terms "acceptable part" or "reject part" refer to the quality in connection with the insert object only. Manufactured injection-moulded parts that indeed correctly feature the insert object naturally may be defective for other reasons and therefore sorted out as reject parts. Acceptable parts ultimately are only the parts that fulfill all stipulated quality requirements.

BRIEF DESCRIPTION OF THE DRAWINGS

The invention is described in greater detail below with reference to the drawings. In these drawings.

DESCRIPTION OF EXEMPLARY EMBODIMENTS OF THE INVENTION

Figure 1:
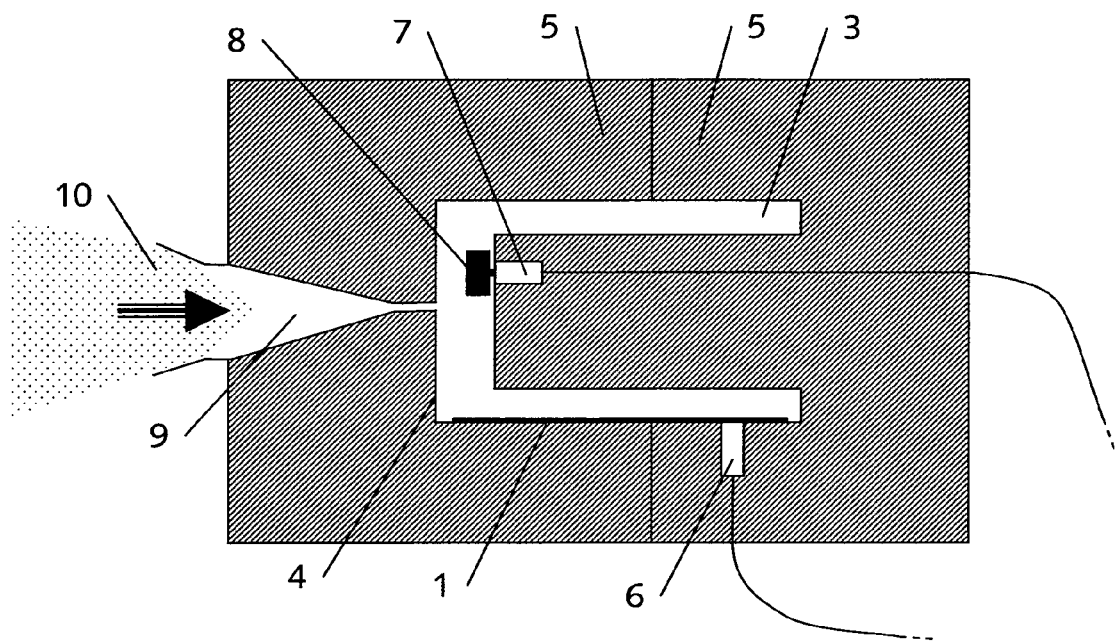
FIG. 1 shows a schematic sectional representation of an injection mould suitable for the inventive method.
Figure 2:
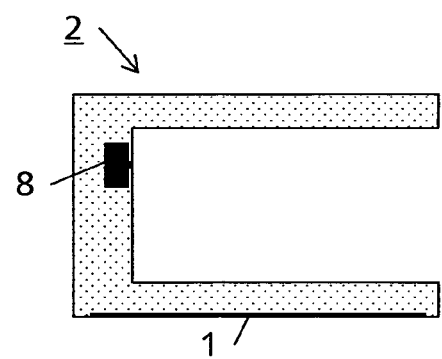
FIG. 2 shows an injection-moulded part produced with a mould according to FIG. 1.

FIG. 1 shows a cross section through a mould 5 of an injection moulding system. The mould 5 consists of two halves that jointly define a cavity 3, wherein said cavity is surrounded by a mould wall 4. The injection-moulded part 2 illustrated in FIG. 2 is produced in this cavity 3 during the injection moulding process. For this purpose, a molten mass 10 in the form of liquid plastic is injected into the cavity 3 through a gate system 9. After the molten mass 10 has solidified, the two mould halves 5 are opened in order to remove the finished injection-moulded part 2. This concludes an injection moulding cycle.

An insert object 1, 8 can be placed into the cavity 3 before the two mould halves 5 are once again joined at the beginning of a new cycle. During the injection of the molten mass 10, this insert object 1 and the molten mass 10 are connected into an injection-moulded part 2.

The inventive method for detecting an insert object 1, 8 in an injection-moulded part 2 is described below.

According to the invention, at least one sensor 6, 7 is arranged in the mould wall 4, wherein said sensor records and analyzes at least one measured value in the form of a temperature or a pressure at least at one point in time during an injection moulding cycle. Based on this analysis, it is then determined whether or not an insert object 1, 8 was present at a certain location in the cavity 3 during the injection moulding cycle. After the ejection of the injection-moulded part 2, it is ultimately sorted as an acceptable part or a reject part based on the analysis of the measured value. However, if an acceptable part should be defective for other reasons such as, for example, insufficient dimensional accuracy, this acceptable part accordingly is also sorted out as reject part. The sorting described herein consequently should be interpreted as pre-sorting.

The advantage of this inventive method is the early detection of an insert object 1, 8 that still takes place during the injection moulding cycle. This eliminates the elaborate handling of the finished injection-moulded part 2 and the utilization of other recognition devices and analyses before the acceptable parts can ultimately be sorted.

The sensor 6, 7 consists of a temperature sensor 6, 7 or a pressure sensor 6, 7.

A temperature sensor 6, 7 can determine the presence of the insert object 1 based on a decelerated increase in temperature at the time, at which the molten mass 10 arrives at the location of the sensor 6, 7, if this insert object directly adjoins the mould wall 4 at the sensor 6, 7. A pressure sensor 6, 7 is also subjected to a lower increase in pressure and/or a lower maximum pressure during the injection moulding cycle if the insert object 1 directly adjoins the mould wall 4 at the sensor 6, 7. In this way, temperature and pressure sensors 6, 7 can detect insert objects 1.

As a general rule, the measured values are recorded during or no later than after the injection process, but always while the injection moulding cycle is still carried out, i.e., before the finished injection-moulded parts are ejected.

The sensors 6, 7 can be installed into the mould wall 4 in different ways. Both aforementioned sensor types 6, 7 may be installed in an opening toward the cavity 3 such that they actually define part of the cavity surface. However, they may also be installed in the mould wall 4 in the immediate vicinity of the cavity 3 such that they can still measure the pressures and/or heat flows transmitted through the remaining mould wall 4 with sufficient accuracy for determining the required variations.

It would naturally also be possible to arrange several sensors 6, 7 in the mould wall 4, for example, in order to determine if an insert object 1, 8 is also correctly positioned. For example, it can be determined if an insert object 1, 8 is positioned askew in the cavity 3 or was shifted from the desired position during the injection moulding process by carrying out the detection at key points such as, for example, at all four corners of a rectangular insert object 1, 8.

It can also be determined if no insert object 1, 8, exactly one insert object or more than one insert object was present at the respective location in the cavity 3 during the injection moulding cycle based on the analysis of the recorded measuring data.

Consequently, an injection-moulded part 2 can also be sorted out as a reject part if several insert objects 1 were inadvertently placed into the cavity. This can be determined, in particular, based on an excessively slow increase in temperature or an excessively low maximum pressure. This likewise can also be checked where no insert object 1, 8 should be located.

It is frequently advisable to record and analyze several measured values, particularly a measured curve. In this way, it can always be determined which data of a data series needs to be evaluated, namely also if time delays occur during the injection moulding cycle. For example, the maximum pressure over the entire injection moulding cycle can be determined based on the measured curve and compared with reference values. On the other hand, the time, at which the molten mass 10 arrives, can be determined based on the measuring data by establishing the time, at which the increase in temperature occurs. At this time, an analysis of the measured values is informative with respect to the detection of an insert object 1.

During the analysis, measured values or measured curves of all sensors 6, 7 are compared with predetermined nominal ranges. The injection-moulded part 2 is sorted as an acceptable part if all recorded measured values or measured curves lie within these nominal ranges.

If several sensors 6, 7 are arranged in the mould wall 4, it is also possible to detect several insert objects 1, 8 at different locations during the injection moulding cycle. The injection-moulded parts 2 ultimately are also sorted as acceptable parts or reject parts based on the analysis of these measured values. It is possible, in particular, to arrange identical and/or different sensors 6, 7 in a mould 5.

The insert object 1 may consist, in particular, of a foil on the outside of the injection-moulded part 2. Examples of such injection-moulded parts 2 with foils on their surfaces are plastic packages for the food industry or medications, as well as consumer goods such as pens with advertising printed thereon. In order to obtain recyclable products, the insert objects 1 preferably consist of the same material as the molten mass for manufacturing the injection-moulded part. Alternative materials include cardboard, paper, aluminum, leather, plastic, metal and textile materials. Other materials naturally can also be used.

Other insert objects 8 are oversprayed with plastic material such that only a small portion lies on the edge of the cavity 3. These insert objects may consist, in particular, of a chip, an LED, a battery, other electronic components and/or electrical lines. If a transparent molten mass 10 is used, oversprayed insert objects 8 may also be visible and used, for example, for decorative purposes.

Product-specific information such as the date and place of manufacture may be written on a chip contained in an injection-moulded part. The chip naturally may subsequently also be provided with other information such as, for example, the date of its installation into a machine. This may be important in order to draw conclusions with respect to the period of use, the period of storage, the manufacturer and/or the manufacture in case this injection-moulded part 2 subsequently fails.

It is preferred to utilize sensors 6, 7 that are simultaneously used for controlling or managing the injection moulding process. This eliminates the need to add other sensors.

LIST OF REFERENCE SYMBOLS

1 Insert object adjoining cavity wall
2 Injection-moulded part
3 Cavity
4 Mould wall
5 Mould
6 Temperature or pressure sensor, sensor
7 Temperature or pressure sensor, sensor
8 Insert object being spaced apart from cavity wall and with only a small portion adjoining the edge
9 Gate system
10 Molten mass, plastic mass

The invention claimed is:

1. A method for detecting an insert object in an injection-moulded part, wherein the insert object is rigidly connected to the injection-moulded part during the injection moulding process due to the fact that the insert object was placed into a cavity that is surrounded by a mould wall of a mould before the beginning of the injection moulding cycle, wherein:
   a) that at least one temperature sensor or pressure sensor is arranged in the mould wall and records and analyzes at least one measured value in the form of a temperature or a pressure at least at one point in time during an injection moulding cycle,
   b) that it is determined if an insert object was present at the location of the sensor in the cavity during the injection moulding cycle based on the analysis, and
   c) that the injection-moulded part is sorted as acceptable part or reject part after its ejection based on the analysis of the measured value.

2. The method according to claim 1, wherein the measured value is recorded during and/or after the injection process.

3. A method for detecting an insert object in an injection-moulded part, wherein the insert object is rigidly connected to the injection-moulded part during the injection moulding process due to the fact that the insert object was placed into a cavity that is surrounded by a mould wall of a mould before the beginning of the injection moulding cycle, wherein:
   a) that at least one temperature sensor or pressure sensor is arranged in the mould wall and records and analyzes at least one measured value in the form of a temperature or a pressure at least pt one point in time during an injection moulding cycle,
   b) that it is determined if an insert object was present at a certain location in the cavity during the injection moulding cycle based on the analysis, and
   c) that the injection-moulded part is sorted as acceptable part or reject part after its election based on the analysis of the measure value; and
   wherein it is determined if no insert object, exactly one insert object or ore than one insert object was present at a certain location in the cavity during the injection moulding cycle based on the analysis of the measured value.

4. The method according to claim 1, wherein the temperature sensor or pressure sensor records and analyzes several measured values, particularly a measured curve, during the injection moulding cycle.

5. The method according to claim 1, wherein several temperature or pressure sensors are arranged in the mould wall and detect one or more insert objects at different locations during the injection moulding cycle, and wherein the injection-moulded part is also sorted as acceptable part or reject part based on the analysis of these measured values.

6. The method according to claim 1, wherein the insert object consists of a foil on the outside of the injection-moulded part.

7. The method according to claim 6, wherein the foil consists of cardboard, paper, aluminum, leather, plastic, metal or textile material.

8. The method according to claim 1, wherein the insert object consists of a chip, an LED, a battery, other electronic components and/or electrical lines.

9. The method according to claim 1, wherein the measured value or measured values or the measured curves of all temperature or pressure sensors are compared with predetermined nominal ranges during the analysis and the injection-moulded part is sorted as acceptable part if all recorded measured values or measured curves lie within their nominal ranges.

10. The method according to claim 1, wherein the sensor for detecting the insert object simultaneously delivers measuring data for the control of the injection moulding system.

11. The method according to claim 3, wherein the temperature sensor or pressure sensor records and analyzes several measured values, particularly a measured curve, during the injection moulding cycle.

12. The method according to claim 3, wherein the insert object consists of a foil on the outside of the injection-moulded part.

13. The method according to claim 3, wherein the insert object consists of a chip, an LED, a battery, other electronic components and/or electrical lines.

14. The method according to claim 3, wherein the measured value or measured values or the measured curves of all temperature or pressure sensors are compared with predetermined nominal ranges during the analysis and the injection-moulded part is sorted as acceptable part if all recorded measured values or measured curves lie within their nominal ranges.

* * * * *